A. STANLEY.
TANK FILLER AND CONTENTS INDICATOR.
APPLICATION FILED OCT. 25, 1919.
1,379,226. Patented May 24, 1921.
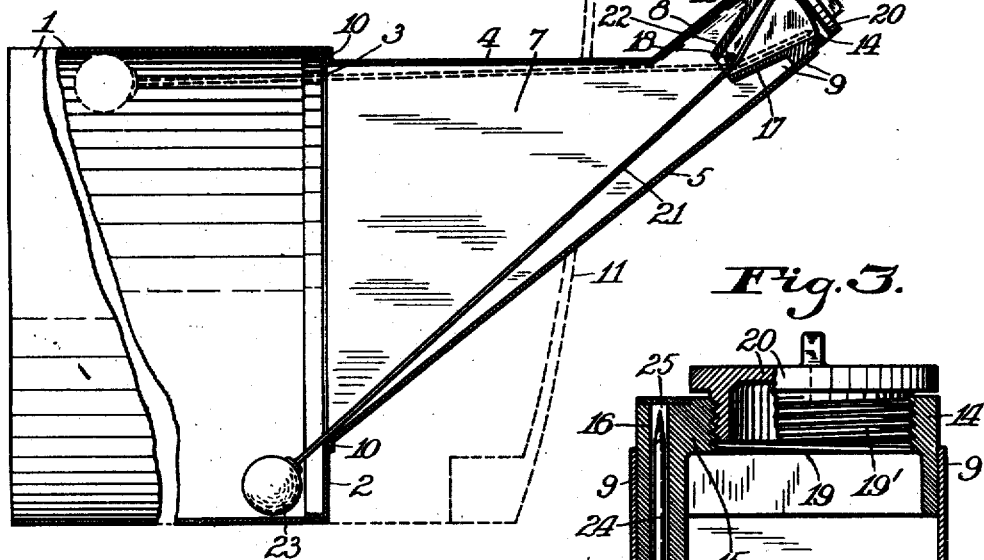
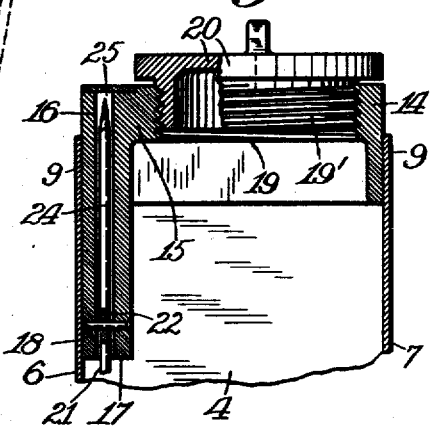
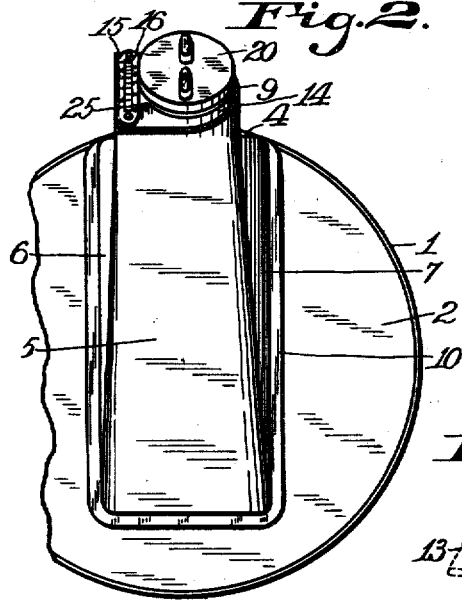
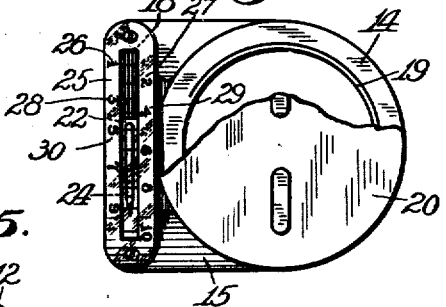
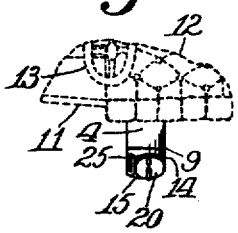
WITNESS:
Robert Liebrich
F. M. Roeder
INVENTOR:
Albert Stanley,
BY
E. D. Silvius,
ATTORNEY.

UNITED STATES PATENT OFFICE.

ALBERT STANLEY, OF INDIANAPOLIS, INDIANA.

TANK-FILLER AND CONTENTS-INDICATOR.

1,379,226. Specification of Letters Patent. Patented May 24, 1921.

Application filed October 25, 1919. Serial No. 333,354.

*To all whom it may concern:*

Be it known that I, ALBERT STANLEY, a citizen of the United States, residing at Indianapolis, in the county of Marion and State of Indiana, have invented a new and useful Tank-Filler and Contents-Indicator, of which the following is a specification, reference being had to the accompanying drawings and to the figures of reference marked thereon.

This invention relates to a tank or reservoir having a side filling conduit extending outward so as to be readily accessible, and to be available when the tank is inclosed or located where it may not be conveniently reached to directly refill it; the invention having reference also to means arranged at the outer end of the conduit for conveniently indicating the volume of the contents of the tank or reservoir, especially when the tank is a part of the equipment of a motor vehicle and inclosed under a vehicle seat.

An object of the invention is to provide an improved tank filler and contents indicator which shall be so constructed as to be adapted to be conveniently connected with a tank or reservoir, and so constructed as to enable an attendant to readily refill the tank and ascertain the approximate quantity of liquid in the tank while it is being filled and later while the contents are being used.

Another object is to provide an automobile fuel tank adapted to be arranged under a seat and which shall be provided with a filler and contents indicator so constructed and arranged as to be readily accessible and visible at all times, without disturbing the occupants of the seat and removing the seat cushions; which filling and indicating appliances shall be of simple and reliable construction and durable and economical in use.

With the above-mentioned and other objects in view, the invention consists in a filling conduit of novel construction and provided with a new and improved inlet portion having contents-indicating appliances arranged so as to be observable at all times; and the invention consists also further in the novel and useful construction, and parts and combinations and arrangements thereof, as hereinafter particularly described and further defined in the accompanying claims.

Referring to the drawings,—Figure 1 is a fragmentary sectional elevation of a tank or reservoir provided with the new filler and contents indicator; Fig. 2 is an end view of Fig. 1; Fig. 3 is a vertical central section of the inlet portion of the filling conduit; Fig. 4 is a top plan of the inlet portion and the contents indicator; and, Fig. 5 is a top view of the inlet portion of the filler and indicator extending out beyond the body and seat cushions of an automobile shown by broken lines.

Similar reference characters in the different figures of the drawings indicate corresponding elements or features of construction herein referred to in detail.

In the drawings the numeral 1 indicates the shell of a tank or reservoir for gasolene or other liquid fuel to supply an explosion engine, and for the purposes of the present invention one vertical end 2 has a vertical slot 3 therein, the tank being in many cases arranged under the operator's seat, so that in such cases the tank can be refilled only after removing the seat cushions and in some cases disturbing passengers.

The improved filling conduit has a top 4, an inclined bottom 5 and upright sides 6 and 7 that are approximately triangular so as to provide a flaring outlet end which is secured to the tank end 2 so that the conduit shall deliver through the slot 3, the arrangement being such that the top 4 is approximately horizontal. The bottom and sides have portions that extend upwardly and outwardly beyond the plane of the top 4, and the top has an inclined extension 8 connected with the sides so as to constitute a relatively small inclined inlet neck 9 having its orifice higher than the top of the tank to permit the tank to be completely filled before the contents overflows from the inlet neck. Preferably the flared outlet end of the conduit has a flange 10 thereon whereby to firmly secure the conduit to the tank end 2. The arrangement of the tank is such that the filling conduit extends through the side wall 11, shown by broken lines, of the motor vehicle body to afford free access to the inlet neck of the conduit, and permitting an operator located on the seat cushion 12 back of the steering wheel 13 to at any time observe the indicator to ascertain when his supply of fuel is running low.

As preferably constructed the inlet neck 9 has a casting secured therein comprising a mouth member 14 having a suitable filling orifice therein and provided on one side of the member with an indicator base 15 having a slot 16 therein, the indicator base having a hanger 17 on its inner portion which preferably is shaped as a flat tube and is provided adjacent to its lower end with a pivot 18. The filling orifice has screw threads 19 therein and is provided with a filling plug or closure 20 having screw threads 19' to engage the screw threads 19. An indicator device is composed of a controlling rod 21 which is arranged in the conduit and provided with a pivot ear 22 that is connected with the pivot 18, the rod extending through the slot 3 into the tank and having a float or buoyant device 23 thereon, a pointer 24 extending from the rod upwardly into the slot 16 and adjacent to an indicator plate 25 which is secured to the upper face of the indicator base 15 so as to cover the slot, the plate being composed of suitable transparent material and being graduated on its outer face and provided with indicating numerals, as 1, 2, 3, 4, 5, as at 26, 27, 28, 29 and 30, respectively, so that when the tank is being filled it can be readily ascertained when the desired quantity is delivered into the tank.

In practical use the float 23 rises with the liquid until the tank is full, when the pointer 24 points to the numeral which indicates the maximum quantity the tank will contain. As the fuel is used the float descends, the controlling rod 21 being permitted to freely move in the slot 3 and in the flared portion of the conduit, so that the pointer 24 is carried successively to the graduating marks on the indicator, until when the pointer arrives at the numeral 2, or at the numeral 1, the operator readily ascertains by observation that only a small quantity remains in the tank and can take the necessary steps to replenish his supply of fuel.

Having thus described the invention, what is claimed as new is—

1. A tank filler and contents indicator including a conduit having an inlet neck, the wall of the neck having a relatively thick portion provided with a vertical slot and also a hanger within the neck at one side thereof, a closure for the neck, an indicator plate secured upon the thick wall portion and covering the slot therein, a pointer pivotally connected to the hanger in the conduit neck and extending toward the indicator plate, a controlling rod fixed on the pointer and extending swingably through the conduit, and a buoyant device fixed on the controlling rod.

2. A tank filler and contents indicator including a conduit comprising a flaring outlet portion and a relatively small inlet neck, the outlet portion having approximately triangular vertical sides affording a deeply flaring and laterally narrow outlet end, the inlet neck having an upwardly-facing portion provided with a slot and having also a downwardly-extending hanger within the neck, a pivot supported by the hanger, an indicator plate secured upon the upwardly-facing portion of the neck and covering the slot, a pointer having a pivot ear connected to the pivot, the pointer extending upwardly in the direction toward the under side of the indicator plate, a controlling rod fixed to the pointer at the pivot ear thereof and extending through the flaring outlet portion of the conduit to swing therein, and a buoyant device fixed on the controlling rod.

3. A tank filler and contents indicator including a conduit having a deeply vertical flaring outlet end and a relatively small inlet neck, the inlet neck being provided with an upward-facing portion having a slot therein and also a hanger within the neck, a transparent indicator plate secured to the upward-facing portion of the inlet neck and covering the slot, a closure detachably connected to the conduit neck, an indicator pointer pivotally connected to the hanger and extending toward and adjacent to the indicator plate, a controlling rod fixed on the pointer and extending into the flaring portion of the conduit, and a buoyant device fixed on the controlling rod.

4. A tank comprising a horizontal shell and a plane vertical end, the end having a vertical slot therein, a filling conduit having a vertically flared outlet end and a relatively small inlet neck, the flared end being secured to said vertical plane end to cover said slot, the top of said conduit being approximately horizontal, the bottom of said conduit extending upwardly at an acute inclination from said tank end, said inlet neck having a mouth member secured thereto which has a filling orifice and also an indicator base, said base having an indicator slot therein and a hanger on the under side of the base, a closure for said orifice, a graduated indicator plate secured to the upper face of said base and covering the indicator slot, said plate being transparent, a pivot supported by the lower portion of said hanger, a pointer supported by said pivot and extending upward toward and nearly to said plate, a controlling rod fixed to said pointer and extending through the flared portion of said conduit and through said vertical slot, and a float fixed on said rod.

5. In a tank filler and contents indicator, the combination with the inlet neck of a filling conduit, of a mouth member secured in said neck and having a filling orifice and also an upwardly facing indicator base on one side of the orifice, said base having an indicator slot therein adjacent to one side of the orifice and also a hanger on the under side of the base, said hanger being hollow and extending downwardly from said slot, the lower portion of said hanger having a pivot therein, a plug screwed into said orifice, a transparent indicator plate secured to the upwardly-facing portion of said base and extending over said slot, an indicator pointer connected to said pivot and extending upwardly toward and nearly to said plate, a controlling rod rigid on said pointer, and a float secured to said rod.

In testimony whereof, I affix my signature in presence of two witnesses.

ALBERT STANLEY.

Witnesses:
E. T. SILVIUS,
F. M. ROEDER.